July 5, 1955 R. F. GARBARINI ET AL 2,712,269
AUTOMATIC DIVE BOMBSIGHT
Filed Dec. 29, 1945 2 Sheets-Sheet 1

INVENTORS:
ROBERT F. GARBARINI
LISLE L. WHEELER
JOHN P. ERICSON
BY
ATTORNEY.

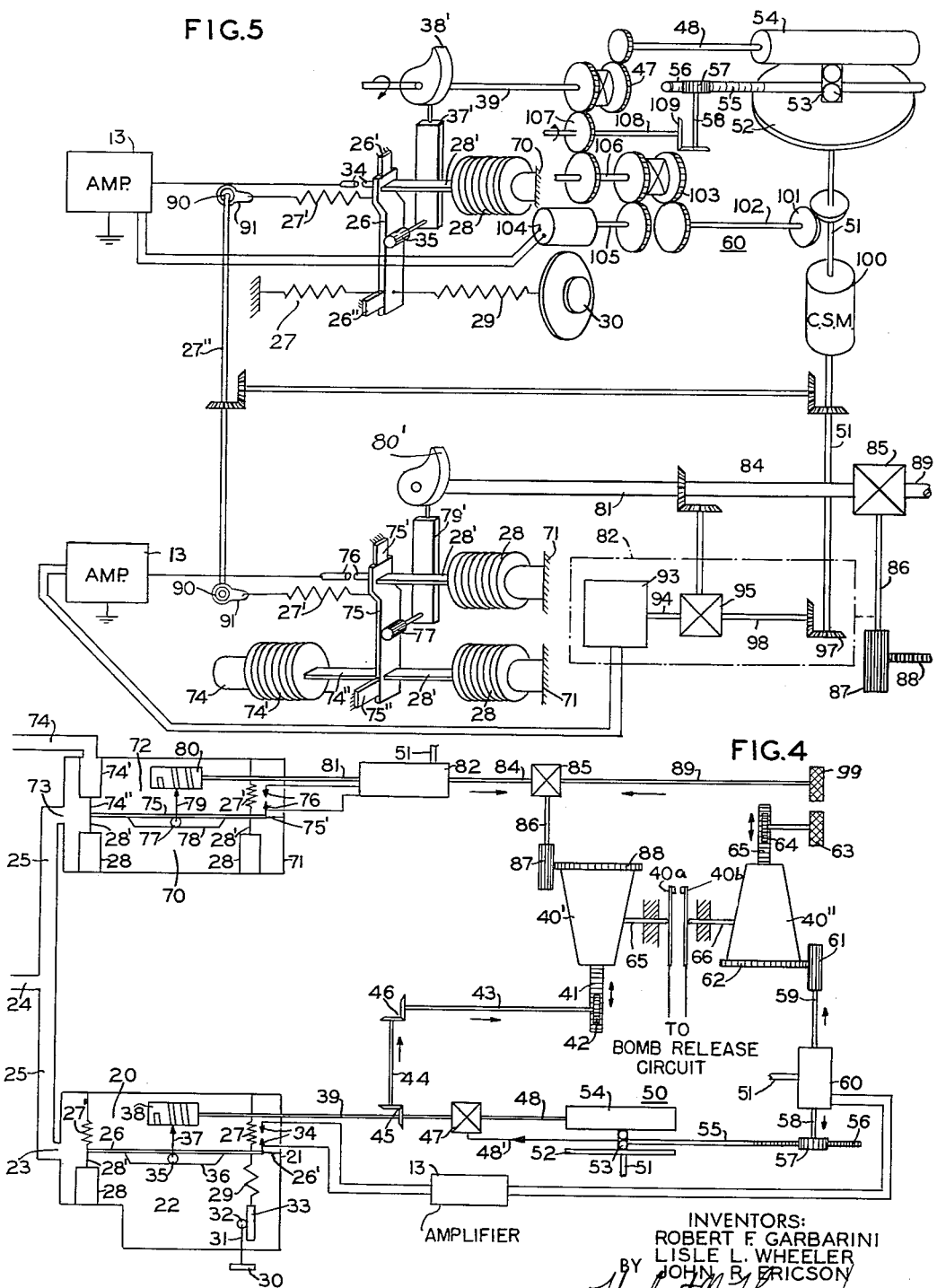

United States Patent Office 2,712,269
Patented July 5, 1955

2,712,269

AUTOMATIC DIVE BOMBSIGHT

Robert F. Garbarini, Woodside, Lisle L. Wheeler, Garden City, and John R. Ericson, Westbury, N. Y., assignors to The Sperry Corporation, a corporation of Delaware Application December 29, 1945, Serial No. 637,978

10 Claims. (Cl. 89—1.5)

This invention relates to a method of, and apparatus for, bombing from aircraft. The method and apparatus are particularly adapted for use in a bomb-release system of an aircraft, especially the bomb-release system of a pursuit bomber, where the bomb is released during a diving maneuver of the aircraft having a bombsight defining a line of sight depressed below the thrust axis of the aircraft.

The invention herein comprehends the simplification of the mechanization of the bombing problem by making special use of force-ratio measuring instruments responsive to factors affecting automatic bomb release from dive-bombers and other aircraft. Such instruments are shown and described in applications S. N. 664,637 by R. F. Garbarini, filed April 24, 1946, now Patent No. 2,557,092, and S. N. 680,366 by R. F. Garbarini and J. Ericson, filed June 29, 1946, now Patent 2,598,681. This invention is also an improvement on the invention shown and described in application Serial No. 539,366, filed by Lisle L. Wheeler and Robert F. Garbarini, June 8, 1944, for Bombsight.

In accordance with one of the methods heretofore used, the pilot of the pursuit bomber is required to begin his bombing run by horizontal flight, at a known altitude, and at a distance sufficiently remote frfom the target, to enable him to pick up the target in the sight from his horizontal path; to maintain a constant speed along the flight path at a predetermined speed value; and to release the bomb, manually, when the pilot observes that the altitude of his airplane above the target, as shown by his altimeter, is equal to that measure of altitude which has been calculated from the previously determined value of air speed and altitude of initial horizontal approach. If the pilot fails to observe all of these controlling conditions, he cannot compute the correct point of bomb release. Such a procedure imposes an undue burden upon the pilot. Furthermore, the the release altitude, computed from the predetermined values of constant air speed and initial tracking altitude, is, to a certain extent, erroneous, because the altitude of release is computed for a zero value of the angle of attack, whereas, generally speaking, during the dive, the angle of attack will vary. Besides, in addition to these extra limitations, imposed upon the pilot's activities during the bombing run, the pilot is restricted to a comparatively small angle of dive, and to a comparatively low altitude for initiating the dive.

One object of this invention is to relieve the pilot of the necessity of determining when to release the bomb.

Another object is to compute the correct point of bomb release from the airplane while the pilot is diving at the target, and to release the bomb automatically at the correct point in the dive.

Another object is to enable the pilot to track the target at any speed within the range of the airplane.

Another object is to dispense with the necessity of starting the dive from horizontal flight at a specified altitude, and permit dive bombing from any altitude at any angle of approach to the target.

Another object is to effect automatic release of a bomb by automatically computing the correct instant for releasing the bomb, as determined by the altitude, air speed, and diving angle of the plane.

Another object is to shorten the approach time when making a bombing run.

Another object is to eliminate need of horizontal flight before picking up the target.

Another object is to eliminate the necessity of diving at a constant rate of speed.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects will appear from the detailed description.

In accordance with this invention, while the airplane is diving toward the target, its speed, and its altitude above the target are used to continuously and automatically compute the correct rate of descent (altitude rate) for releasing the bomb, under the particular set of flight conditions then in effect, and, when the rate of descent of the aircraft becomes equal to the computed rate of descent, a condition is established to automatically release the bomb, and a signal is given to the pilot indicating that the bomb run is completed.

One form of the invention includes static and dynamic pressure-responsive devices, embodying computers, for continuously positioning one bomb-release contact according to the rate of descent required for release of the bomb from the plane to strike the target. At the same time, a cooperating bomb-release contact is continuously positioned according to the actual rate of descent of the plane. When the two contacts coincide, they complete a circuit which operates the bomb-releasing mechanism.

Dive angle, as proposed in the Wheeler and Garbarini application, above identified, may be used in place of rate of descent, described herein. However, this form of the invention is subject to certain limitations due to the fact that some pendulous device, such as a gyro vertical, must be used to measure the actual diving angle of the aircraft. As is well known, accelerations of the aircraft tend to displace such devices from the true vertical direction, and erection mechanisms must be employed to return them to the true vertical. After maneuvering the aircraft, it is necessary to fly a steady course, for an appreciable length of time, to permit operation of the erection mechanism, before the correct measure of the diving angle of the airplane is obtained. For this reason the computer does not operate the bomb-release mechanism accurately until the necessary time interval, required for gyro-erection, has elasped.

In order to avoid the necessity for delaying the release of the bomb, after maneuvering the aircraft, it is preferred herein to use rate of descent of the aircraft as a release control condition. It has been found that, for any given air speed, the diving angle depends upon a function of the rate of change of altitude. This may be proven trigonometrically, as will subsequently appear.

Since the correct diving angle for releasing the bomb depends upon air speed and altitude, it is possible, by the apparatus hereinafter described, to compute the correct altitude rate (rate of descent) for releasing the bomb, for any particular speed of the aircraft. The computed altitude rate and air speed then correspond to the correct diving angle for releasing the bomb. In this manner, instead of computing the correct diving angle for releasing the bomb, the correct rate of change of altitude for releasing the bomb is computed from the air speed and altitude of the aircraft. Since the diving angle depends upon the rate of change of altitude, as well as the air speed, computation of the altitude rate effects the same result as computation of the diving angle for releasing the bomb.

Thus, in the preferred form of the invention, one bomb-release contact is positioned according to the computed rate of change of altitude at which the aircraft must be diving in order for a bomb released therefrom to strike the sighted target, as determined by the actual altitude and air speed of the aircraft, while to simultaneously position the other contact, means are provided for continuously measuring the rate of change of altitude of the aircraft. In this apparatus, the computing altimeter operates a differentiating mechanism to provide the release computing apparatus with a measure of the rate of change of altitude, i. e., the rate of descent. This computing apparatus may be adjusted according to the static air temperature at the plane, to provide an accurate measure of the rate of change of altitude at which the aircraft is diving.

When the two contacts are positioned at the same rate of change of altitude, the bomb-release mechanism is actuated to initiate release of the bomb.

Each computer is designed for a specific type of plane, having its own angle-of-attack characteristics, and for a class of bombs having substantially the same ballistic coefficient. The computer, however, is so constructed that by replacing the release altitude rate cam by another like cam, having different lift values, the computer can then be used in other airplanes, having different angle-of-attack characteristics, and with classes of bombs having different ballistic coefficients. The computer automatically compensates for variable angle of attack, something which the pilot could not possibly do either mentally or physically. Thus, under attack conditions, the pilot is free to devote all his energies to the control of the plane.

In the drawings, comprising two sheets, of five figures, numbered Figs. 1 to 5, both inclusive, certain embodiments of the invention are set forth.

Fig. 4 is a schematic showing of a novel bomb-release computer; and

Fig. 5 is a schematic showing of an altimeter.

Figure 1:
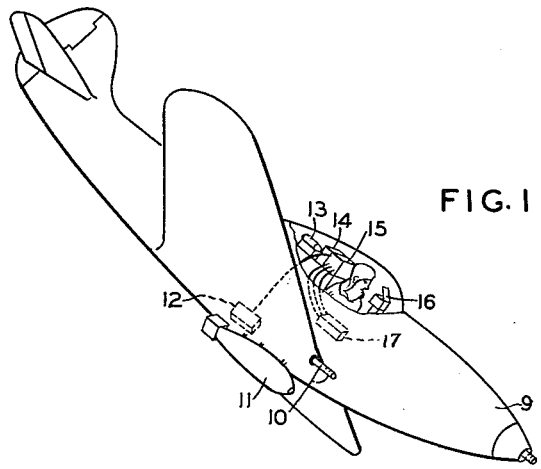
Fig. 1 is a perspective view of an airplane, showing the general location of the bomb, and of the bomb-release mechanism.

Like reference characters designate corresponding parts throughout the several figures of the drawings. An airplane 9 is shown in Fig. 1 with certain dive bombing equipment mounted thereon including a Pitot tube 10 and a bomb 11. A bomb release mechanism 12, such as the usual bomb release shackles is shown as being controlled by a computer 14—15. The reference character 13 indicates servomotor amplifiers for the bomb sight of the present invention. A control box 17, carrying various control knobs, shown in Figs. 4 and 5, for adjusting the computer of the present invention is mounted at the front of the cockpit. The knobs of the control box actuate the computer by flexible shafts indicated by dotted lines in the drawing. An optical sighting head 16 mounted in front of the pilot defines a line of sight depressed at a fixed angle below the thrust line of the airplane.

Figure 2:
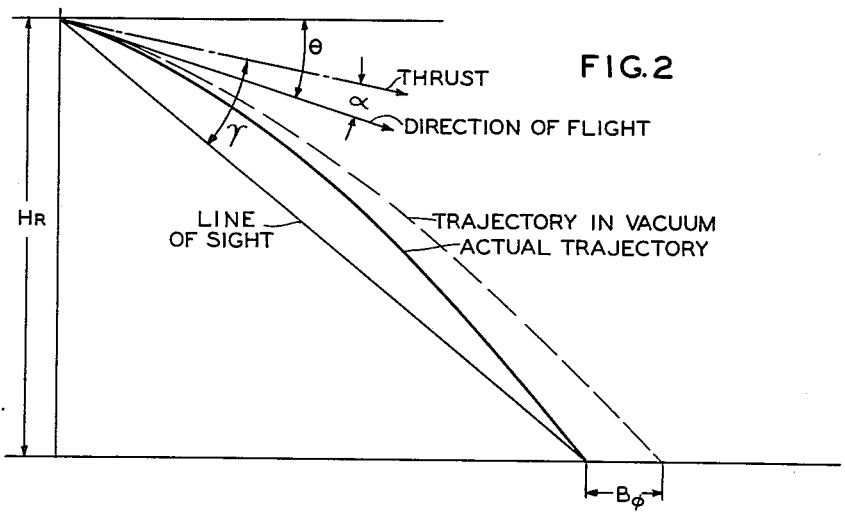
Fig. 2 is a vector diagram showing the trigonometric elements required herein for establishing and solving the equations determining automatic bomb-release conditions.

Referring now to Fig. 2, and to facilitate understanding of the basic theory underlying the invention herein, certain tentative assumptions will be made; this will permit simpler expression of the mathematical relations involved. In the final analysis, these assumptions will be removed, and the theory made applicable to the true problem. These tentative assumptions (see Fig. 2), are as follows:

(a) The angle of attack ($\alpha$), corresponding to the angle between the direction of flight of the aircraft and its thrust axis, is equal to zero.

(b) The speed of the target ($V_T$), and wind velocity ($V_W$), at the target, are zero.

(c) The trajectory is that of a bomb falling in a vacuum, which eliminates from the equations the effect of air resistance. Hence the range lag ($B_\phi$) of the bomb is equal to zero.

The release altitude ($H_R$) for a bomb falling in a vacuum is given by the following equation:

$$H_R = \frac{2V^2}{g} \cos^2 \theta \, \tan^2(\theta+\gamma) \left\{1 - \frac{\tan \theta}{\tan(\theta+\gamma)}\right\} \quad (1)$$

Equation 1 can be derived from the conditions postulated in Fig. 2. It applies only when the line of sight is depressed below the thrust axis of the aircraft through an angle of depression ($\gamma$). If the acceleration due to gravity ($g$) is considered constant, Equation 1 shows that the altitude for release ($H_R$) is a function of the true air speed ($V$), and the dive angle ($\theta$). This, or an equivalent equation, can be solved, mechanically, by a bomb-release computer. Such a computer requires: (a) mechanism to continuously provide the altitude of the aircraft above the target, (b) mechanism to provide the true air speed of the aircraft, and (c) mechanism to provide a measure of the dive angle ($\theta$). If desired, the dive angle ($\theta$) may be replaced by the measurable variable time rate of change of actual altitude, rate of descent) ($\dot{H}$), which is related to the dive angle ($\theta$) in the manner indicated by the equation:

$$\sin \theta = \frac{\dot{H}}{V} \quad (2)$$

or $$\theta = \sin^{-1} \frac{\dot{H}}{V} \quad (3)$$

From Equation 3, the following equations are derived:

$$\cos \theta = \cos \left(\sin^{-1} \frac{\dot{H}}{V}\right) \quad (4)$$

$$\tan \theta = \tan \left(\sin^{-1} \frac{\dot{H}}{V}\right) \quad (5)$$

$$\tan (\theta+\gamma) = \tan \left\{\left(\sin^{-1} \frac{\dot{H}}{V}\right)+\gamma\right\} \quad (6)$$

By substituting Equations 4, 5 and 6 in Equation 1 we obtain:

$$H_R = \frac{2V^2}{g} \cos^2 \left(\sin^{-1}\frac{\dot{H}}{V}\right) \tan^2\left\{\left(\sin^{-1}\frac{\dot{H}}{V}\right)+\gamma\right\} \left\{1 - \frac{\tan\left[\sin^{-1}\frac{\dot{H}}{V}\right]}{\tan\left[\left(\sin^{-1}\frac{\dot{H}}{V}\right)+\gamma\right]}\right\} \quad (7)$$

Equation 7 discloses that the release altitude ($H_R$) is a function of true air speed ($V$), and actual altitude rate ($\dot{H}$). It can likewise be said that, the time rate of change ($\dot{H}_R$), of the release altitude ($H_R$), is a function of the actual altitude ($H$), and the true air speed ($V$), since, from Equation 7, the release altitude rate ($\dot{H}_R$) can, theoretically at least, be expressed in terms of actual altitude (H), and true air speed (V), where the release altitude rate ($\dot{H}_R$) is that rate of change of altitude at which the aircraft should descend, when it has a true air speed (V), to be diving, at the correct angle for releasing the bomb, as determined by its true air speed (V), and its altitude. From this relation, it is apparent that the correct altitude rate ($\dot{H}_R$), for releasing the bomb, is a function of the altitude (H), and air speed (V), of the aircraft. This may be written as:

$$\dot{H}_R = f(H, V) \qquad (8)$$

In Equation 8 the angle of attack ($\alpha$), and the range lag ($B_\phi$), are assumed to equal zero. The function expressed by Equation 8 can be used to develop a three-dimensional cam, which may be translated in actual altitude (H), and rotated in true air speed (V), thus giving a lift to the cam follower which is proportional to release altitude rate ($\dot{H}_R$). When this lift matches the actual altitude rate ($\dot{H}$) of the airplane, the bomb-release circuit is closed to release the bomb from its shackle. Since the three-dimensional cam requires a measure of true air speed (V), and of actual altitude (H), and, since a measure of actual altitude rate ($\dot{H}$) is required to match the lift of the follower of the three-dimensional cam at release, special devices are employed herein to compute these variables from other quantities which are directly available.

$$H_{MR} = \frac{2V_m^2}{g} \cos^2\left\{\sin^{-1}\left(\frac{\dot{H}_M}{V_M}\right)\right\} \tan^2\left\{\left(\sin^{-1}\frac{\dot{H}_M}{V_M}\right)+\gamma\right\}\left\{1-\frac{\tan\left[\sin^{-1}\frac{\dot{H}_M}{V_M}\right]}{\tan\left[\left(\sin^{-1}\frac{\dot{H}_M}{V_M}\right)+\gamma\right]}\right\} \qquad (7A)$$

The equation for the actual altitude (H) of an airplane above the target is:

$$H = 221.151 T_{MA}\left(\log_{10}\frac{P_T}{P_S}\right) \qquad (9)$$

Wherein:
$T_{MA}$ is the mean absolute atmospheric temperature between the airplane and the target;
$P_T$ is the static air pressure at the target, which, in the majority of cases, is at ground level or sea level.
$P_S$ is the static air pressure at the airplane. If an exact value of actual altitude (H) is to be obtained, the varying values of absolute mean temperature ($T_{MA}$), and static pressure ($P_S$), must be continuously fed into the altitude computing mechanism.

The equation for altitude rate is:

$$\dot{H} = \frac{dH}{dt} \qquad (10)$$

$\frac{dH}{dt}$ is the time rate of change of altitude, altitude rate, or rate of descent.

The true air speed of an airplane may be determined by the following equation:

$$V^2 = 7RT\left\{\left[\left(\frac{P_G}{P_S}\right)^{\frac{1}{3.5}}\right]-1\right\} \qquad (11)$$

Wherein:
T is the absolute temperature of the air at the airplane;
R is a thermodynamic gas constant;
$P_S$ is the static pressure at the airplane; and
$P_G$ is the gross pressure at the airplane, being the total pressure, measured along the thrust line of the airplane.

It is possible to modify these equations so as to reduce the variables in each, without a loss of accuracy in the over-all solution.

In its modified form Equation 9 becomes:

$$H_M = 221.151 T_{CMA}\left(\log_{10}\frac{P_T}{P_S}\right) \qquad (9A)$$

Wherein:
$H_M$ is the modified altitude of the airplane.
$T_{CMA}$ is a constant mean absolute atmospheric temperature, chosen to give an accurate solution.

In its modified form Equation 10 becomes:

$$\dot{H}_M = \frac{\sqrt{T}}{\sqrt{T_C}}\frac{dH_M}{dt} \qquad (10A)$$

$\frac{dH_M}{dt}$ = time rate of change of modified altitude ($H_M$) as given by Equation 9A
$T_C$ is a constant temperature considered as the temperature at the airplane for purposes of calculation.

In its modified form Equation 11 becomes:

$$V_M^2 = 7RT_C\left\{\left[\frac{P_G}{P_S}\right]^{\frac{1}{3.5}}-1\right\} \qquad (11A)$$

The result of these postulated modifications is that simpler mechanisms are employed to solve Equations 9A, 10A and 11A, in comparison to those which would be required to solve Equations 9, 10 and 11.

In its modified form Equation 7 can be written:

Equation 7A can be written in the following functional form:

$$\dot{H}_{MR} = f(H_M, V_M) \qquad (8A)$$

which shows that the modified release altitude rate ($\dot{H}_{MR}$) is a function of the modified altitude ($H_M$) and the modified air speed ($V_M$).

Since Equations 8 and 8A neither include the effect of angle of attack, nor the range lag due to air resistance, a computer based on Equations 8 and 8A would be inaccurate. When angle of attack ($\alpha$) and range lag ($B_\phi$) are considered, the release equation becomes:

$$H_R = \frac{g}{2V^2 \cos^2\theta}\{H_R \cot(\theta+\gamma-\alpha)+B_\theta\}^2 + \{H_R \cot(\theta+\gamma-\alpha)+B_\theta\}\tan\theta \qquad (12)$$

Range lag may be obtained from graphs established for each type of bomb, and is a function of dive angle ($\theta$), release altitude ($H_R$), true air speed (V), (at release), and of a ballistic coefficient ($C_x$) of the bomb. This relationship may be written thus:

$$B\phi = W(\theta, H, V,) \text{ for a ballistic coefficient } (C_x) \qquad (13)$$

$$\alpha = G(\theta, H, V,) \text{ for the airplaine} \qquad (14)$$

Figure 3:
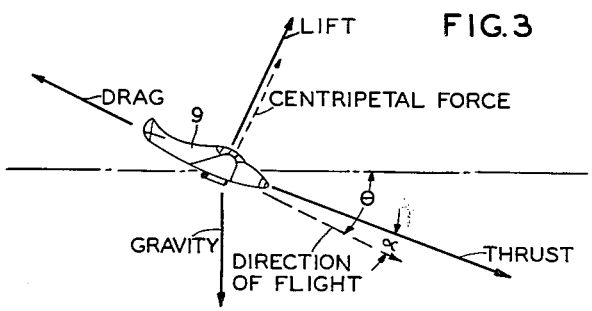
Fig. 3 is a vector diagram of the forces acting upon an airplane when dive-bombing a target.

Equation 14 can be derived from a vector diagram of the forces acting upon the airplane during flight and data concerning the airplane's lift coefficient (referring to Fig. 3).

As before:

$$\theta = \sin^{-1}\frac{\dot{H}}{V} \qquad \text{(see 3)}$$

By solving Equations 12, 14, 3, and the range lag graph, simultaneously, using the method of successive approximation, a table can be made which gives the value of release altitude rate ($\dot{H}_R$), as a function of actual altitude (H), and true air speed (V). This table and the system of equations can be written thus:

$$\dot{H}_R = F(V, H) \qquad (15)$$

where the effects of range lag ($B_\phi$) and angle of attack ($\alpha$) are included.

Computations have shown that if a cam, designed for the function (15), is positioned by modified air speed ($V_M$), and modified altitude ($H_M$), instead of true air speed (V), and actual altitude (H), the lift would be proportional to modified release altitude rate ($\dot{H}_{MR}$). Therefore, modified release altitude rate ($\dot{H}_{MR}$) has the same relation to modified air speed ($V_M$), and modified altitude ($H_M$), and can be written thus:

$$\dot{H}_{MR} = F(V_M, H_M) \tag{15A}$$

Numerical proof has shown that Equation 15A is valid.

An approximate correction for any motion of the target and the wind, is obtained by first estimating components of the magnitude of target velocity ($V_T$) and wind velocity ($V_W$), in the direction of flight, and then adding these components to the modified air speed ($V_M$), of the airplane. The relation between target velocity ($V_T$), and wind velocity ($V_W$), and their components, depends upon the dive angle, which is continually changing. Since the correction for target speed and wind velocity, is at best only approximate, an average dive angle for release ($\theta_M$), is assumed constant in making this correction, the component to be added to the modified air speed ($V_M$) equals.

$$(V_T + V_{\bar{W}}) \sec \theta_M \tag{16}$$

The special force-ratio measuring and computing devices used herein are self-contained, and are so constituted and arranged as to directly deliver outputs, with torque, corresponding to the rate of change of altitude of the plane, and the computed rate of descent required for release of the bomb from the plane to strike the target. These outputs are cooperatively combined in special automatic bomb release control mechanism, as will appear more fully herein.

As shown in Fig. 4, the automatic bomb release system includes a computing altimeter 20, a computing air speed meter 70, and a bomb release switch mechanism 40. The mode of coupling of these devices and their auxiliary mechanisms into a cooperative and coordinated operative entity will now be described with particular reference to implementing the control systems to function according to the laws set out in Equations 9A, 10A, 11A and 16.

The equations identified above permit the utilization of ambient control factors together with fixed or postulated (assumed) average constant or assumed constant values of modifying factors to eliminate temperature modifications as determinants in the operation of the instruments herein. By so doing, as explained previously, the control factors, and the equipment necessary to utilize such factors, are reduced to a minimum, with a resultant simplification in construction and operation of the instruments, and the relieving of the pilot from any necessity of constant supervision of the mechanisms during a bombing run.

As will be seen, the manipulations required of the pilot will be limited to the operation of certain control knobs to initially impose corrections or approximations on the system to introduce the values corresponding to assumed target pressure ($P_T$), wind ($V_W$) and target velocity ($V_T$), and a temperature correction for the temperature at the plane ($T_P$). The values delivered to the bomb release switch mechanism will represent modified altitude ($H_M$), modified air speed ($V_M$), and modified altitude rate ($\dot{H}_M$), which modified values are sufficient, under the governing laws of the instrumentalities herein, to give accurate ballistic results.

The specific instrumentalities shown schematically in Fig. 4 comprise an altitude meter 20 and an air speed meter 70, the detailed operative parts of which are schematically illustrated in Fig. 5. These meter structures or devices, are also computers, and have been specifically described and claimed in application Serial No. 680,366 of Robert F. Garbarini and John Ericson, filed June 29, 1946, now Patent 2,598,681, and the novel force ratio measuring system of these instruments has been described and claimed in application Serial No. 664,637 filed April 24, 1946, now Patent 2,557,092 in the name of R. F. Garbarini.

The computing altimeter 20 and the computing air speed meter 70 may be combined in a single casing having a common plenum chamber, as described and claimed in application Serial No. 680,366, now Patent No. 2,598,681 above identified.

The altimeter herein, which is designated generally by numeral 20, will comprise a hermetically sealed casing 21, defining an inner space or plenum chamber 22, having an inlet 23, connected to the static pressure side 24 of a Pitot tube through one leg of a branched connecting tube 25. The chamber 22 will, therefore, be responsive to static pressure ($P_S$) obtaining at the altitude of the plane.

The special force ratio measuring system comprises a lever 26 horizontally mounted in the casing with only one degree of freedom, in the following manner: a flat spring 26' secures one end of the lever to the casing, while a second flat spring 26", Fig. 5, is mounted at the other end of the lever, at right angles to its longitudinal axis, and is likewise secured to the casing. Counterbalancing springs 27, 27' are respectively mounted at opposite ends of the lever and serve as yieldable suspension members, effective, with the horizontal flat springs, to maintain the lever 26 relatively fixed in the longitudinal and transverse axes thereof, but free for limited rotation about its pivot in its vertical or Y axis.

An evacuated bellows 28 is mounted in and on the casing and connected, through a third flat spring 28', to the lever at one end, and in vertical, axial alignment with the counter-balancing spring 27'. At the other end of the lever a calibrated spring 29, which can be adjusted for target pressure ($P_T$), is counter-balanced by spring 27, and is varied in tension by a control knob 30 acting through control shaft 31, pinion 32 and rack 33. A pair of contacts 34 are mounted for cooperative action at one end of the lever and are connected to the input circuit of an amplifier 13, which controls an intermittently operable motor 104 of servomotor unit 60 (Fig. 4).

A variable fulcrum 35 is apposed to lever 26, for movement in its horizontal axis, to vary the force arms of the lever. This fulcrum is mounted for translation or oscillation parallel to the longitudinal axis of the lever, and is restrained against other movements by constraining members such as a track or guideway designated generally by 36. A cam follower 37 is used to actuate fulcrum 35, and is translatable along the lever axis by a spiral drum cam 38 mounted on a reversely rotatable shaft 39, whose rotation is a function of the modified altitude ($H_M$), as will appear more fully herein.

A switch mechanism 40 is provided with a pair of cooperating contacts 40a and 40b mounted for independent displacement by lift pins 65 and 66 of three-dimensional cams 40' and 40" whose surfaces are generated in modified altitude rate for release ($\dot{H}_{MR}$), and actual modified airplane altitude rate ($\dot{H}_M$), respectively. The cam 40' is translated in modified altitude ($H_M$) by a rack 41, driven by pinion 42 mounted on shaft 43, which is operatively connected to a rotatable shaft 39 through connecting shaft 44 and bevel gears 45, 46.

The time rate of change of the modified altitude, $$\left(\frac{dH_m}{dt}\right)$$

with a preset temperature correction, is used to position the cooperating bomb release switch control cam 40". The apparatus effective for this purpose comprises a differential 47, having an output shaft 39, an input shaft 48, and a second input shaft 48'. The shafts 48 and 48' feed into the differential from a variable speed device 50, comprising a disc 52 driven by shaft 51, the disc contacting the ball carriage 53 which rotatably engages drum 54 along a longitudinal axis. The ball carriage is translated by shaft or rod 55, having a rack 56, which is engaged and driven by a pinion 57, mounted on shaft 58 of servomotor unit 60 which is shown in detail in Fig. 5. The connection 48' of Fig. 4 and the differential 47 add the motion of ball carriage 53 to the motion of shaft 48, to effect a stabilizing action on the output of servomotor unit 60. In Fig. 5, shaft 108 and gear 107 provide a stabilizing connection corresponding to 48'. Further stabilizing of the servomotor output is effected by dithering the lever 26, through shaft 27'' Fig. 5 driven by the constant speed motor 100, the shaft having an eccentric 80 mounted thereon which actuates a link 91 coupled to the lever through either one of counter-balancing springs 27, 27'. The output shaft 108 of the servo unit 60, which is shown in block diagram in Fig. 4 rotates cam 40'' in rate of change modified altitude $$\left(\frac{dHm}{dt}\right)$$

through pinion 61 and ring gear 62. The cam 40'' is displaced in translation and is corrected for temperature at the airplane (T$_P$) by a rack 65 fixed thereto which is driven by pinion 64 controlled by temperature correction knob 63. Cam 40'' is laid out to displace its follower 66 in accordance with modified altitude rate ($\dot{H}_M$).

The servomotor unit 60, shown more in detail in Fig. 5, will be seen to comprise a constant speed motor 100 driving shaft 51. Bevel gearing 101 connects shaft 51, through shaft 102, with subtracting differential 103. An intermittently operable motor 104 is coupled into this differential through connection 105. The output of the differential is fed into the variable speed device 50, through a gear train comprising shaft 106, gear 107 (48'), shaft 108, bevel gears 109, to shaft 58. Adding differential 47 is also powered from gear 107.

The cooperating air-speed measuring and control mechanism comprises an altimeter 70 having a sealed casing 71, defining a plenum chamber 72. A static pressure (P$_s$) opening 73, in the casing, is connected to static pressure connecting tube 25, so that the plenum chamber is responsive to static pressure, simultaneously with the altimeter 20. As already noted, both of these instruments may be contained in a single plenum chamber. The casing 71 is provided with a second inlet 74 connected to the gross pressure (P$_G$) opening of the Pitot tube whose static side has been designated 24. The total pressure inlet 74 is directly connected to the interior of a bellows 74' within the casing. A pair of evacuated bellows 28 are respectively mounted in the casing, and are connected to a force ratio measuring lever 75 through flat springs 28'. The lever 75 has a colinear flat spring mounting 75' connecting it to one wall of the casing, and a transverse flat spring 75'', in the horizontal plane of spring 75', connecting it to an adjacent wall of the casing, at the other end of the lever. The bellows 74' is connected to the common bearing point of springs 28' and 75'', Fig. 5, the two bellows 74' and 28 being thus mounted in tandem.

The second bellows 28 is counter-balanced by the spring 27', secured to the top of the casing and forming, with bellows 74' and spring 74'', vertical suspension members for the lever 75. A pair of contacts 76 are cooperatively mounted at one end of the lever, and are effective to close the input circuit of an amplifier 13 which controls an intermittently operable servomotor unit 82. The lever 75 is provided with a movable fulcrum 77, mounted for horizontal translation in gauge or track 78, the fulcrum being actuated by a cam follower 79 driven by a spiral drum cam 80, which is reversely rotatable by shaft 81 driven by the intermittent servomotor system 82.

The servo unit 82 as shown in Fig. 5 includes an intermittently operable motor 93 which is controlled by an amplifying unit of amplifier 13. One input of a subtracting differential 95 is operated by the shaft 94 of the motor. A shaft 96, which is a second input for differential 95, is driven from shaft 51 of the constant speed motor 100 through gears 97 and shaft 98. Motors 100 and 93 cooperate through the train of mechanism just referred to, to oscillate fulcrum 77 about a position wherein the respective forces acting on the lever are balanced, the displacement of the servo unit output shaft, 81—84, Fig. 4, being a measure of the ratio of the forces acting on the lever. Constant speed motor 100 is effective, when contacts 76 are open to drive through differential 95 to displace fulcrum 77 so as to unbalance the lever in such direction as to close contacts 76. This energizes the input circuit of amplifier 13 which causes motor 93 to start. The latter motor operates at higher effective speed than constant speed motor 100, which is continuously operating. When motor 93 operates, due to its higher rate, it reverses the direction of shaft 81 as well as cam 80 or 80' and also fulcrum 79, and thereby opens contacts 76 which stops motor 93, whereupon the motor 100 again becomes effective to displace the fulcrum in the opposite direction and again close contacts 76. The cycle of operation is continuous. This servo arrangement and force ratio measuring system are disclosed in detail in the above mentioned applications Serial No. 680,366, and 634,637 while details of a dither mechanism for a pair of instruments controlled by a single constant speed motor are disclosed in the application, Serial No. 539,366 also previously referred to.

The servomotor unit 82, as shown in Fig. 4 is connected, through a shaft 84, to a differential 85, having an output shaft 86, on which is mounted a pinion 87 engaging a ring gear 88 on cam 40', for rotating the latter in modified air speed (V$_M$). A wind and target velocity approximation is imposed on the differential output shaft 86, by a knob 99 and shaft 89 feeding into differential 85.

In the form shown in Fig. 5, the variable fulcrum translating mechanisms may be operated by flat spiral cams instead of the drum cams described above. Thus in Fig. 5, flat spiral cam 38', mounted on shaft 39, will engage the cam follower of fulcrum translating rod 37', which is biased thereagainst. Similarly, flat spiral cam 80', mounted on shaft 81, may replace drum cam 80, and is effective to translate the spring-biased cam follower of fulcrum translating rod 79'.

The detailed operation of the automatic bomb release mechanism switch control will thus be readily apparent. In operation, the pilot will set the knobs 30, 63 and 99, for the proper approximate or assumed values of target pressure, ambient air temperature at the plane, and approximate wind and target velocities.

With the constant speed motor 100 in operation, the drum 54 is driven through ball carriage 53, and shaft 39 is rotated through shaft 48 and differential 47. Spiral cam 38 rotates with shaft 39 and translates the fulcrum 35. The translation of fulcrum 35 will unbalance the force arms of lever 26 and close contacts 34, thereby energizing intermittently operable motor 104. Since motor 104 has a greater effective rate than constant speed motor 100, when motor 104 operates it reverses the direction of output shaft 106 of differential 103, and accordingly, rack 56 will be driven to translate the ball carriage 53 and vary the speed and direction of rotation of drum 54, to reverse the direction of travel of fulcrum 35 by reversing the rotation of spiral cam 38'. When the equilibrium point of the lever 26 is reached by the fulcrum, the contacts 34 will be separated and motor 104 stopped. The switch cam 40' is thus continuously translated in modified altitude by this cyclic operation. Concomitantly with the translation of the switch cam 40', it is rotated, in modified air speed, by the output of the computing air speed meter 70.

In this latter device, modified air speed ($V_M$) is continuously obtained as a ratio of gross pressure ($P_G$) to static pressure ($P_S$). The gross pressure will be the resultant of the forces applied by apposed bellows 28 and 74', respectively responsive to static pressure and gross pressure, and of static pressure applied at the other end of the lever by a second bellows 28, also responsive to static pressure at the plane. If it is preferable to indicate air speed on a basis of the ratio of dynamic pressure ($P_D$) to static pressure ($P_S$), the evacuated bellows 28 opposite bellows 74' must be opened to the static pressure of the plenum chamber or replaced by a supporting spring similar to 27'. The resulting force acting on the lever 75 by the bellows 74' will be the difference between gross and static pressure, that is dynamic pressure. The bellows 28 opposite 27' applies a static pressure force to its end of the lever. Thus, by suitably developing the surface of cam 80 (80'), the air speed meter 70 will indicate modified air speed ($V_M$) according to the following equation:

$$V_M{}^2 = 7RT_c\left\{\left[1+\frac{P_D}{P_s}\right]^{\frac{1}{3.5}}-1\right\} \qquad (11A')$$

11A' being obtained from equation 11A by the substitution of $P_G = P_D + P_s$.

The constant speed motor 100 is connected into the servo system 82 in any suitable manner, and is effective to drive the rotated shaft 81 and the spiral drum cam 80, to translate fulcrum 77 to unbalance lever 75 and close contacts 76. The closing of these contacts is effective to close the circuit of intermittently operated motor 93 of the servomotor unit 82, which drives through shaft 84 into differential 85, to rotate cam 40', as a function of the modified air speed ($V_M$). The intermittent operation of the control circuits is the same for both meters, and they operate simultaneously to control the switch cam 40' and bring it into the position for the calculated modified altitude rate or rate of descent required for bomb release. Simultaneously, the rate of change of modified altitude $$\left(\frac{dH_m}{dt}\right)$$

is imposed on cam 40", which controls the movement of switch contact 40B. When the calculated rate of descent and the actual rate of descent are equal, the contacts 40A and 40B will be in engagement, and the bomb release circuit will be closed.

The advantages of the device herein, over the one disclosed in Wheeler and Garbarini application Serial No. 539,366, will be apparent. The operation herein is strictly automatic, the pilot being relieved from all supervisory control during the bomb run. The computing mechanisms and the altitude and air speed measuring mechanisms are combined in common force ratio measuring instruments which do not require separate auxiliary equipment.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Computing apparatus for a dive bombsight on an aircraft having a line of sight fixed with reference to the thrust axis of the aircraft comprising, in combination, automatic means for measuring air-speed, altitude and rate of change of altitude, respectively, each of said automatic means having an output with torque, a three-dimensional cam displaceable by said altitude measuring means in accordance with tthe altitude of the aircraft and by said air-speed measuring means in accordance with the air-speed of the aircraft, a second three dimensional cam operated by said rate of change of altitude measuring means according to the rate of descent at which said aircraft must dive to strike a target in the line of sight of said bombsight and means controlled by the cams to produce the action of bomb release.

2. Computing apparatus for a dive bombsight on an aircraft having a line of sight fixed with reference to the thrust axis of the aircraft comprising, in combination, automatic computer means for directly measuring air-speed, altitude and rate of change of altitude, respectively, each of said automatic means having an output with torque, a three-dimensional cam translatable by said altitude measuring means in accordance with altitude and rotatable by said air-speed measuring means in accordance with the air-speed of the aircraft, a second three-dimensional cam operated by said rate of change of altitude measuring means according to the rate of descent at which said aircraft must dive to strike a target in the line of sight of said bombsight and means controlled by the cams to produce the action of bomb release.

3. In combination with a dive bombsight having a fixed line of sight depressed with respect to the thrust axis of a bombardment aircraft, a pair of three dimensional cams provided with lift pins, force ratio measuring means controlled by the changing ratio of static and dynamic air pressure due to the motion of the aircraft when diving at a target for actuating one of the cams in one dimension in accordance with air-speed and in a second dimension in accordance with altitude, the cam being laid out to displace its lift pin in accordance with the rate of change of altitude at which the aircraft must be diving in order for a bomb released therefrom to strike a target tracked by said line of sight, rate measuring means operated by the first mentioned means for actuating the other cam of the pair in accordance with the rate of change of altitude, the cam being laid out to displace its lift pin according to rate of change of altitude corrected for temperature, and means controlled by the lift pins to produce the action of bomb release when the rate computed by the first cam corresponds to the actual rate by which the lift pin of the second cam is displaced.

4. In combination with a dive bombsight having a fixed line of sight depressed with respect to the thrust axis of a bombardment aircraft, a pair of three dimensional cams provided with lift pins, a Pitot tube, force ratio measuring means controlled thereby, in accordance with the changing ratio of static and dynamic air pressure when the aircraft is diving, for actuating one of the cams in one dimension in accordance with air-speed and in a second dimension in accordance with altitude, the cam being laid out to displace its left pin in accordance with the rate of change of altitude at which the aircraft must be diving in order for a bomb released therefrom to strike a target tracked by said line of sight, rate measuring means operated by the first mentioned means for actuating the other cam of the pair in accordance with the rate of change of altitude, the cam being laid out to displace its lift pin according to rate of change of altitude corrected for temperature, and means controlled by the lift pins to produce the action of bomb release when the rate computed by the first cam corresponds to the actual rate by which the lift pin of the second cam is displaced.

5. In combination with a dive bombsight having a fixed line of sight depressed with respect to the thrust axis of a bombardment aircraft, a Pitot tube, an automatic bomb release apparatus controlled by the Pitot tube during a dive bombing operation, which comprises a pair of three dimensional cams provided with lift pins, force ratio measuring means connected with the Pitot tube controlled by the changing ratio of static and dynamic air pressure therefrom for providing a measure of true air-speed and true altitude, means controlled by the force ratio measuring means for actuating one of the cams in one dimension in accordance with air-speed and in a second dimension in accordance with altitude, the cam being laid out to displace its lift pin in accordance with the rate of change of altitude at which the aircraft must be diving in order for a bomb released therefrom to strike a target tracked by said line of sight, rate measuring means operated by the first mentioned means for actuating the other cam of the pair in accordance with the rate of change of altitude, the cam being laid out to displace its lift pin according to rate of change of altitude corrected for temperature, and means controlled by the lift pins to produce the action of bomb release when the rate computed by the first cam corresponds to the actual rate by which the lift pin of the second cam is displaced.

6. In combination with a dive bombsight having a fixed line of sight depressed with respect to the thrust axis of a bombardment aircraft, a pair of independently operable three dimensional cams provided with lift pins, force ratio measuring means controlled by the changing ratio of static and dynamic air pressure for displacing one of the cams in accordance with true air-speed and true altitude, the cam being laid out empirically to compute the rate of change of altitude required for release of a bomb from the plane to strike a given target, a rate measuring device controlled by the force ratio measuring means for displacing the other of the cams in accordance with the time rate of change of altitude, a pair of cooperating bomb release contact members disposed in co-alignment with the respective lift pins for individual operation thereby, the cams being designed to close the contacts the instant that one cam has a predetermined output displacement with respect to the other.

7. In a dive bombsight, for a bombardment aircraft, a bomb release apparatus controlled by the movement of the aircraft when diving at a target, which comprises a Pitot tube, force ratio measuring means connected thereto controlled by the changing ratio of dynamic and static air pressure, a three dimensional cam laid out empirically to compute the altitude rate required for bomb release and actuated by the force ratio measuring means in accordance with true air-speed and altitude, a rate measuring device controlled by the force ratio measuring means according to altitude, a second cam actuated by the rate measuring device for computing true altitude rate, and means controlled by the cams to produce the action of bomb release when one cam has a predetermined output displacement with respect to the other.

8. A bomb release computer for a dive bombsight controlled solely by the motion of the supporting bombardment aircraft when diving at a target which comprises a pair of independently operable three dimensional cams provided with lift pins, the cams being laid out empirically to displace their lift pins respectively in accordance with the altitude rate required for bomb release and actual altitude rate, force ratio measuring means responsive to changing static and dynamic air pressure for displacing one of the cams in one dimension in accordance with air-speed and in another dimension in accordance with altitude, a rate measuring device controlled by said means for displacing the other cam in one dimension according to altitude rate, initially adjustable means for displacing the latter cam in a second dimension in accordance with the temperature at the airplane, and bomb release means continuously actuated by the respective lift pins effective to release a bomb the instant the lift pin of the first mentioned cam attains a predetermined displacement with respect to that of the second cam.

9. A bomb release computer for a dive bombsight controlled solely by the motion of the supporting bombardment aircraft when diving at a target, which comprises a Pitot tube, a pair of independently operable three dimensional cams provided with lift pins, one of the cams being laid out empirically to displace its lift pin in accordance with predetermined functions of air-speed and altitude, the other cam being laid out to displace its lift pin in accordance with altitude rate, force ratio measuring means coupled with the Pitot tube controlled by changing static and dynamic air pressure for displacing the first mentioned cam in accordance with air-speed in one dimension, and in accordance with altitude in the other dimension, means controlled by the force ratio measuring means for displacing the other cam in accordance with the time rate of change of altitude, and bomb release means actuated by the respective lift pins the instant the lift pin of one cam attains a predetermined position with respect to the lift pin of the other.

10. A bomb release computer for a dive bombsight controlled by the motion of the supporting bombardment aircraft when diving at a target, which comprises a Pitot tube, a pair of independently operable three dimensional cams provided with lift pins, one of the cams being laid out empirically to displace its lift pin in accordance with the altitude rate required for bomb release based upon predetermined functions of air-speed and altitude, the other cam being laid out to displace its lift pin in accordance with altitude rate, force ratio measuring means coupled with the Pitot tube controlled by changing static and dynamic air pressure for displacing the first mentioned cam in accordance with air-speed in one dimension and in accordance with altitude in a second dimension, means controlled by the force ratio measuring means for displacing the other cam in accordance with the time rate of change of altitude, a pair of cooperating bomb release contacts one for each lift-pin disposed respectively to be continuously displaced thereby and to be brought into engagement the instant the displacement of the lift pin of the first mentioned cam coincides with a corresponding actual altitude rate displacement of the lift pin of the other cam.

References Cited in the file of this patent

UNITED STATES PATENTS

| | | |
|---|---|---|
| 2,191,250 | Pischel | Feb. 20, 1940 |
| 2,371,606 | Chafee et al. | Mar. 20, 1945 |
| 2,409,648 | Van Auken | Oct. 22, 1946 |
| 2,410,058 | Frische et al. | Oct. 29, 1946 |
| 2,410,097 | Morgenthaler | Oct. 29, 1946 |
| 2,410,468 | Van Auken | Nov. 5, 1946 |